(12) United States Patent
Kluge et al.

(10) Patent No.: US 11,454,270 B2
(45) Date of Patent: Sep. 27, 2022

(54) FASTENING ELEMENT FOR INSERTION INTO AN OPENING OF A VEHICLE BODY PART AND METHOD FOR ASSEMBLY OF SUCH A FASTENING ELEMENT

(71) Applicant: ILLINOIS TOOL WORKS INC., Glenview, IL (US)

(72) Inventors: Martin Kluge, Iserlohn (DE); Martina Brautigam, Iserlohn (DE)

(73) Assignee: Illinois Tool Works Inc., Glenview, IL (US)

( * ) Notice: Subject to any disclaimer, the term of this patent is extended or adjusted under 35 U.S.C. 154(b) by 46 days.

(21) Appl. No.: 16/793,671

(22) Filed: Feb. 18, 2020

(65) Prior Publication Data
US 2020/0263720 A1    Aug. 20, 2020

(30) Foreign Application Priority Data
Feb. 20, 2019   (DE) ...................... 10 2019 104 319.0

(51) Int. Cl.
*F16B 21/08* (2006.01)
*F16B 2/22* (2006.01)

(52) U.S. Cl.
CPC .............. *F16B 21/082* (2013.01); *F16B 2/22* (2013.01)

(58) Field of Classification Search
CPC ........ F16B 21/082; F16B 2/22; F16B 21/086; F16B 1/0071; F16B 5/0628; F16B 19/008; F16B 21/08
See application file for complete search history.

(56) References Cited

U.S. PATENT DOCUMENTS

| | | | | |
|---|---|---|---|---|
| 7,017,239 B2* | 3/2006 | Kurily | ................. | B60R 13/0206 24/297 |
| 7,114,221 B2* | 10/2006 | Gibbons | ................. | F16B 5/065 24/289 |
| 7,152,281 B2* | 12/2006 | Scroggie | ............. | B60R 13/0206 24/297 |
| 7,976,056 B2* | 7/2011 | Kirchen | .............. | B60R 13/0206 280/728.2 |
| 8,221,042 B2* | 7/2012 | Vitali | .................... | F16B 21/086 411/510 |
| 8,561,265 B2* | 10/2013 | Benedetti | .............. | F16B 21/086 24/297 |

(Continued)

FOREIGN PATENT DOCUMENTS

DE    102012001195 A1    7/2013

*Primary Examiner* — Robert Sandy
*Assistant Examiner* — Louis A Mercado
(74) *Attorney, Agent, or Firm* — Thompson Hine LLP (57) ABSTRACT

A fastening element (1) for insertion into an opening (50) of a part (51), in particular a vehicle body part, wherein the fastening element (1) has a head region (2), a flange region (3), which is connected to the head region (2) via a first shaft region (4), and a second shaft region (5), which continues from the flange region (3) on the side opposite the head region (2) and is formed such that, in the inserted state of the fastening element (1) in the opening (50), it extends through the opening (50), at least in certain regions, and forms a snap connection with the part (51), in particular vehicle body part, wherein at least one indicator element (6) is associated with the fastening element (1) for, in particular, acoustically and/or visually signaling an assembly state of the fastening element (1).

16 Claims, 6 Drawing Sheets

(56) References Cited

U.S. PATENT DOCUMENTS

| | | | |
|---|---|---|---|
| 8,613,128 B2* | 12/2013 | Moerke | F16B 21/086 |
| | | | 24/453 |
| 9,200,660 B2* | 12/2015 | Tisol, Jr. | F16B 21/02 |
| 9,333,554 B2* | 5/2016 | Kanie | B21J 15/041 |
| 9,631,653 B2* | 4/2017 | Flynn | F16B 5/0621 |
| 2009/0133228 A1 | 5/2009 | Werner | |
| 2012/0131770 A1 | 5/2012 | Iwahara | |
| 2014/0196259 A1 | 1/2014 | Kuhm | |
| 2017/0182949 A1 | 6/2017 | Kato | |
| 2020/0141440 A1* | 5/2020 | Liebelt | F16B 21/07 |
| 2020/0325926 A1* | 10/2020 | Arteta | B60R 13/0206 |

* cited by examiner

FASTENING ELEMENT FOR INSERTION INTO AN OPENING OF A VEHICLE BODY PART AND METHOD FOR ASSEMBLY OF SUCH A FASTENING ELEMENT

TECHNICAL FIELD

The present invention relates to a fastening element for insertion into an opening of a part, in particular vehicle body part. The fastening element according to the invention can be designed here as a single-part clip, in particular made of plastic, which serves, for example, for fastening vehicle closure panels, such as, for example, interior trim parts, or, for example, for fastening door seals in the door frame of vehicles or vehicle bodies. Of course, however, the present invention is not restricted to such areas of use.

BACKGROUND

For the rapid assembly in particular of vehicle closure panels, such as, for example, inner door trim parts, use is made of "panel fasteners" which essentially have a shaft region with an engagement device snapping elastically into place and a suitably shaped head region which is formed in such a manner that it latches with the inner side of a receptacle, such as, for example, a seat, on the inner trim panel. The force required for the engagement (latching) of the engagement device snapping elastically into place is preferably lower than the force required to release it.

Such fastening elements also serve, for example, for fastening other parts to a vehicle body, such as, for example, seals or sealing strips which are attached in a door frame of a vehicle.

It is known in this connection that the shaft region of the fastening element supports at least one spring element which, upon insertion into an opening of a body, is temporarily deformed and subsequently reaches with a latching shoulder or the like under the boundary or the edge region of the opening from the other side in order thereby to secure the fastening element against being pulled out.

It is also known to provide a resilient flange region at a distance from the head, said flange region, after the assembly of the fastening element, being closed against the facing side of the body in order to seal the opening. The flange region is generally shaped conically in order to apply a spring force.

Such fastening elements are normally pre-installed on the inner trim panel or on a part to be fastened, wherein such a substructure assembly is then fastened to the body part of the vehicle, such as, for example, to the inner side of a door, etc. For the rapid installation of the pre-installed substructure assembly by simply pressing it onto the body part of the vehicle, the body part is provided with corresponding through bores (openings) which are positioned in such a manner that they correspond to the fastening elements pre-installed on the substructure assembly.

According to embodiments of the fastening elements under consideration here the bores (openings) provided in the vehicle body part can have plastics bushings into which the respective shaft regions of the fastening elements pre-installed on the substructure assembly and elastic locking devices on the shaft regions of the fastening elements lock by snapping into place.

One disadvantage of the fastening elements known from the prior art is that it is not possible, or is possible at least only with a relatively great effort, to check whether the fastening elements are positioned, in particular aligned, and fixed securely and satisfactorily in the corresponding openings of the vehicle body part.

The secure assembly of installation parts with the aid of fastening elements is, however, frequently of crucial importance, in particular also whenever the fastening elements are used for fastening, for example, sensors in applications critical to safety, such as, for example, airbag systems.

SUMMARY

On the basis of this problem, the present invention is based on the object of developing a fastening element of the type mentioned at the beginning to the effect that a secure and correct assembly and/or positioning of the fastening element in the opening of the vehicle body part can be checked or ascertained without a relatively great effort.

A further object on which the present invention is based can be considered that of specifying a corresponding method for assembly of a fastening element, in particular in a through bore of a part of a vehicle body.

In respect of the fastening element, the object on which the invention is based is achieved by the subject matter of independent patent claim 1, wherein advantageous developments of the fastening element according to the invention are specified in the corresponding dependent patent claims.

In respect of the method, the object on which the invention is based is achieved by the subject matter of the further independent patent claim, patent claim 16.

Accordingly, the invention relates in particular to a fastening element for insertion into an opening of a part, in particular a vehicle body part, wherein the fastening element has a head region, a flange region, which is either a bottom part of the head region, e.g. the side facing the part, or which is spaced from the head region and is connected to the head region via a first shaft region, and a second shaft region. The second shaft region of the fastening element continues from the flange region on the side opposite the head region and is formed such that, in the inserted state of the fastening element in the opening, it extends through the opening, at least in certain regions, and forms a snap connection with the part, in particular vehicle body part. If the flange region is part of the head region, a first shaft region is not provided between flange region and head region—however, for standardized designation reasons, the second shaft region continues to be designated the second shaft region in this case, even if there is no first shaft region between flange region and head region. The head region preferably has a centering spring for the radial centering of an object to be fastened to the head region.

The fastening element according to the invention is designed in particular as a single-part plastics fastening clip. However, the invention is not restricted to a single-part construction of the fastening element. On the contrary, the fastening element can also be of multi-part design.

It is also conceivable that a corresponding plastics bushing is also accommodated in the opening of the vehicle body part, into which plastics bushing the second shaft region is introduced during the assembly of the fastening element.

In order to be able to verify a correct assembly of the fastening element, it is in particular provided according to the invention that at least one indicator element is associated with the fastening element for in particular acoustically and/or visually signaling an assembly state of the fastening element. The at least one indicator element of the fastening element is preferably designed for acoustically and/or visually signaling an assembly state of the fastening element.

The advantages which can be obtained with the invention are obvious: by means of the provision of at least one indicator element, the assembly of the fastening element is particularly simple since a person undertaking the assembly obtains acoustic and/or visual feedback via the at least one indicator element when the fastening element by means of the second shaft region and in particular by means of spring elements correspondingly provided on the second shaft region has reached its secured installation position in which the second shaft region or corresponding spring elements provided on the second shaft region, or the like, have effectively formed or can effectively form a snap connection with the vehicle body part.

The at least one indicator element is formed in particular to preferably acoustically and/or visually signal at least one of the following assembly states of the fastening element:

the reaching of a minimum pressure force which is exerted in particular via the second shaft region during assembly of the fastening element and is required for the second shaft region to extend through the opening of the body part, at least in certain regions, to the extent that a snap connection with the boundary or with the edge region of the opening can be formed with the second shaft region of the fastening element;

the formation of a snap connection of the second shaft region with the boundary or the edge region of the opening in the vehicle body part;

a precise positioning of the fastening element in the opening in the vehicle body part; and using the fastening element again after the latter has already been pressed previously with a minimum pressure force into an opening, in particular an opening of a vehicle body part.

In a manner which is particularly easy to realize but is nevertheless effective, according to embodiments of the fastening element the at least one indicator element is designed as an element which protrudes radially from the fastening element, at least in certain regions, and which is connected to the flange region or to the first shaft region of the fastening element via at least one joint region such that, during the assembly of the fastening element in the opening of the vehicle body part, the protruding element is pressed through the boundary or edge region of the opening relative to the flange region and/or relative to the first shaft region of the fastening element contrary to the insertion direction of the fastening element.

In other words, in this embodiment, the element protruding radially from the fastening element, at least in certain regions, is used as an indicator in respect of the positioning of the fastening element in the opening of the vehicle body part since the indicator element—depending on the depth to which the fastening element or the second shaft region of the fastening element is introduced into the opening of the vehicle body part—assumes a different, in particular visually perceptible position.

According to embodiments of the fastening element according to the invention, the at least one indicator element can be designed as a destructively formed indicator element, which is formed to in particular optically and/or acoustically, signal an assembly state of the fastening element in a non-regenerative manner.

Such a non-regenerative construction of the indicator element has the advantage that it can easily be identified whether a fastening element has already been used or assembled and has subsequently been removed and is being reused.

In a refinement, which is particularly easy to realize, but is nevertheless effective, of the previously mentioned embodiment, in which the at least one indicator element is designed as a destructively formed indicator element, the indicator element is designed as an element which protrudes radially from the fastening element, at least in certain regions, and which is connected to the flange region or first shaft region via at least one joint region such that, during the assembly of the fastening element, the protruding element is pressed through the boundary or edge region of the opening relative to the flange region and the first shaft region contrary to the insertion direction of the fastening element.

In this connection, the at least one joint region can have at least one predetermined breaking point and in particular predetermined kink point, which is formed to collapse under a previously specified or specifiable critical pressure load contrary to the insertion direction of the fastening element. The critical pressure load of the at least one predetermined breaking point and in particular predetermined kink point is preferably specified such that it is reached when the minimum pressure force required for assembly of the fastening element is exerted on the fastening element in the insertion direction.

As already indicated, it is of advantage if the at least one joint region via which the at least one indicator element which protrudes radially from the fastening element, at least in certain sections, is connected in a jointed manner to the flange region or to the first shaft region is designed as a predetermined kink point or has at least one predetermined buckling point.

Such a predetermined kink point—in contrast to a predetermined breaking point—has the crucial advantage that, when the predetermined kink point responds, complete collapse of the predetermined kink point does not occur.

In other words, even after response of a predetermined kink point, the indicator element is (still) physically connected to the fastening element via the predetermined kink point; however, in the mentioned state, forces can then no longer be transmitted via the predetermined kink point or the region can then no longer act as a jointed region in the sense of a jointed region prior to the response of the predetermined kink point.

Of course, however, it is also conceivable if the at least one joint region via which the indicator element which protrudes radially from the fastening element, at least in certain regions, is connected in a jointed manner to the flange region or to the first shaft region of the fastening element has at least one predetermined breaking point.

However, it is at least then of advantage if a securing device is associated with the at least one indicator element, which securing device is formed such that the indicator element is not physically separated from the fastening element—in spite of the collapse of the at least one predetermined breaking point. A possible example of such a securing device is a film hinge or film joint preferably formed in the region of the at least one predetermined breaking point.

In order to optimize the response behavior of the at least one indicator element, it is provided, according to embodiments of the fastening element according to the invention, that the at least one indicator element has an arm region extending in the insertion direction of the fastening element, at least in certain regions, wherein a distal end region of the arm region is located in a plane which is spaced further from the plane in which, or through which, the head region of the fastening element is located or extends than the plane in which, or through which, the flange region of the fastening element is located or extends.

As already indicated previously, it is not absolutely necessary for the at least one indicator element of the fastening element to be designed as a destructively formed indicator element, which is formed to in particular optically and/or acoustically signal an assembly state of the fastening element in a non-regenerative manner. On the contrary, it is also conceivable if the indicator element is designed as a regeneratively formed indicator element.

An example of such a regeneratively formed indicator element which can be mentioned is an indicator element which has an arm region extending in the insertion direction of the fastening element, at least in certain regions, wherein said arm region is connected in a jointed manner to the first shaft region or to the flange region of the fastening element such that the arm region can move relative to the first shaft region and/or relative to the flange region of the fastening element in a direction contrary to the insertion direction of the fastening element. It can be provided in particular here that the joint region via which the arm region of the indicator element is connected in a jointed manner to the first shaft region or to the flange region of the fastening element is designed without a corresponding predetermined breaking point and in particular predetermined kink point.

Instead of such a predetermined breaking point and in particular predetermined kink point, by contrast a notch arrangement or at least one notch can be associated with the indicator element, in which notch arrangement or notch the distal end region of the arm region of the indicator element engages during its movement relative to the first shaft region and/or relative to the flange region of the fastening element and provides the person assembling the fastening element with a corresponding acoustic signal, in addition to the acoustic signal generated by the kinking or breaking of the predetermined kink point or predetermined breaking point.

Of course, however, other embodiments for correspondingly regeneratively designed indicator elements are also suitable.

In order to permit a particularly advantageous manufacturing and therefore mass production of the fastening element, it is provided, according to embodiments of the present invention, that the at least one indicator element is formed in one piece at least with the flange region and with the first and second shaft region of the fastening element and, together with the flange region and the first and second shaft region, has a monolithic construction, in particular made from plastics material.

In particular, at least the indicator element can be formed with the flange region and the first and second shaft regions within the scope of a plastics melting process. The plastics melting process can be an ultrasonic melting process or a hot stamping process or a hot riveting process. Ultrasound makes it possible for the plastic to be thermally melted in a simple manner, as is known from ultrasonic plastics welding.

Alternatively or additionally thereto, the fastening element can be provided with a region made of softer plastic, for example a sealing region, in a two-component injection-molding method. The plastics melting process can then be carried out in a particularly simple manner in terms of production in the casting mold for the two-component injection-molding method.

In particular, it is provided, according to embodiments of the fastening element according to the invention, that the fastening element has, in particular on the flange region, a seal having a circumferential outer sealing face, wherein, in a non-assembled state of the fastening element, the outer sealing face is located in a plane which is spaced further from the plane in which, or through which, the head region of the fastening element is located or extends than the plane in which the distal end region of the at least one indicator element is located.

A plurality of indicator elements are preferably provided per fastening element. Particularly preferably, a total of three, and in particular precisely three, indicator elements are provided per fastening element, which are arranged in a preferably uniform distribution in the circumferential direction of the fastening element. With this embodiment, an assembly state of the fastening element can therefore be signaled via three indicator elements arranged in a uniform distribution over the circumference. This embodiment delivers particularly precise feedback via a correct definition of the position at least of the second shaft region in the opening of the vehicle body part.

According to embodiments, the fastening element is constructed in an at least substantially rotationally symmetrical manner. A body is rotationally symmetrical (also radially symmetrical) if the rotation of the body by a certain angle about its axis of symmetry brings the body to coincide with itself again.

The fastening element can be in particular rotationally symmetrical n-fold, wherein n is the number of indicator elements.

The head region of the fastening element can have a centering spring for radial centering of an object to be fastened to the head region, wherein the centering spring is preferably produced integrally with the fastening element in the multi-component injection-molding method, and wherein in particular the centering spring is made from a softer material than the flange region and/or the second shaft region.

According to a further aspect of the present invention, the at least one indicator element and preferably all indicator elements of the fastening element each have an axially extending pin element, which are held in an axial opening of a radially outwardly extending lug of the flange region or first shaft region via at least two, preferably three, preferably radially extending predetermined breaking points or predetermined kink points and are designed such that, when a minimum pressure force exerted on the second shaft region, in particular via the head region (2) of the fastening element (1), during assembly of the fastening element is reached, they are axially displaced with respect to the lug to the extent that the predetermined breaking points or predetermined kink points collapse.

The invention furthermore relates to an optimized method for assembly of a fastening element, in particular in a through bore of a vehicle body part, wherein first of all a fastening element of the previously mentioned type according to the invention is provided. Subsequently, the second shaft region of the fastening element is introduced into the through bore, and a pressure force is exerted on the fastening element in the insertion direction. The pressure force exerted on the fastening element is selected here to be at least high enough for the at least one indicator element of the fastening element to respond and in particular acoustically and/or visually signal that the minimum pressure force required for assembly of the fastening element has been exerted on the fastening element. It is preferably provided here that the pressure force exerted on the fastening element is selected to be at least high enough for all indicator elements of the fastening element to respond.

BRIEF DESCRIPTION OF THE DRAWINGS

Exemplary embodiments of the fastening element according to the invention will be described below with reference to the attached drawings, in which.

Unless stated otherwise, the same reference signs used in the drawings refer to identical or identically acting components.

DETAILED DESCRIPTION

The exemplary embodiments of the fastening element 1 according to the invention that are shown schematically in the drawings in particular involve a heartflex panel fastener. However, the present invention is not in any way limited to such a type of fastener.

The fastening elements 1 shown in the drawings are formed from a plastics material, wherein certain regions of the fastening elements 1, in particular the seals 11 provided on the fastening elements 1, are made from a softer plastic than the remaining regions of the fastening elements 1. Greater flexibility is thereby provided in the regions which are formed from the softer plastics material. This is firstly required for the seal 11 so that the latter, in the assembled state of the fastening element 1, can effectively close the opening 50 formed in the vehicle body part 51.

Secondly, in some embodiments of the fastening element 1 according to the invention, regions of the heat region 2 of the fastening element 1 or regions of a transition between the head region 2 and a first shaft region 4 of the fastening element 1 are also formed from a relatively soft, flexible plastics material in order thereby to ensure increased flexibility of the head region 2 in relation to the remaining part of the fastening element 1.

Of course, it is, however, also conceivable in principle to produce the fastening element 1 completely from one and the same plastics material, in particular during an injection-molding method.

In a brief summary, the exemplary embodiments of the fastening element 1 according to the invention that are shown in the drawings substantially have the same construction: they consist of a head region 2, a flange region 3, which is connected to the head region 2 via a first shaft region 4, and a second shaft region 5, which continues from the flange region 3 on the side opposite the head region 2. The second shaft region 5 is formed in such a manner that, in the inserted state of the fastening element 1 in the opening 50 of the vehicle body part 51, it extends through the opening 50, at least in certain regions, and forms a snap connection with the vehicle body part 51, as can be gathered in particular from the schematic sectional view in FIG. 12.

In the exemplary embodiments shown in the drawings, the flange region 3 is formed relatively flat. However, it would be conceivable if the flange region 3 is designed to be slightly conical.

The seal 11 which has already been mentioned is integrally formed, in certain regions, on the flange region 3. As an alternative thereto, it would, however, also be conceivable to the design the entire flange region 3 as the seal 11. The flange region 3 with the integrally formed seal 11 is formed overall to be circularly conical and—because of the softer plastics material of the seal 11—to be resilient.

In the exemplary embodiments shown in the drawings, the first shaft region 4 which connects the flange region 3 to the head region 2 of the fastening element 1 is designed overall to be at least substantially cylindrical.

The second shaft region 5 which, in the installed situation (cf., for example, FIG. 12) extends, at least in certain regions, through the passage opening 50 formed in the vehicle body part 51 is designed, in the exemplary embodiments of the fastening element 1 according to the invention that are shown in the drawings, as a three-footed heartflex clip although this embodiment should not be regarded as limiting.

Figure 1:
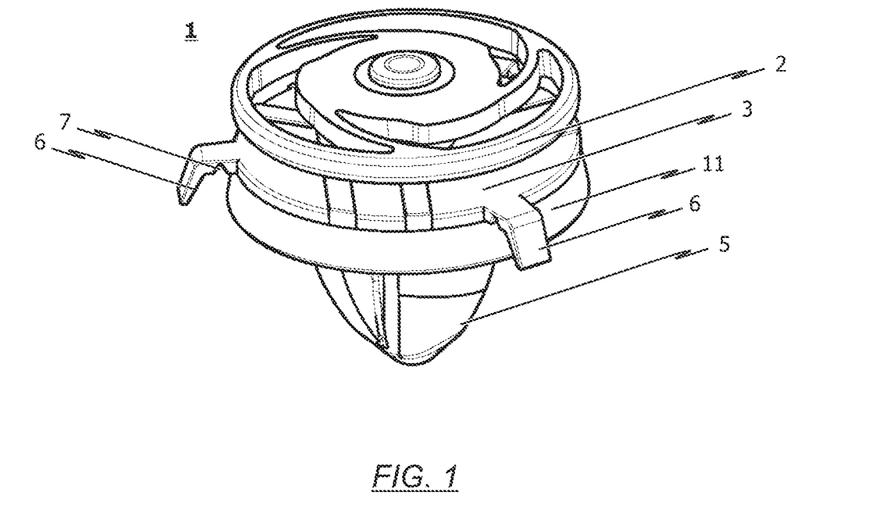
FIG. 1 shows a first exemplary embodiment of the fastening element according to the invention schematically and in an isometric view.
Figure 2:
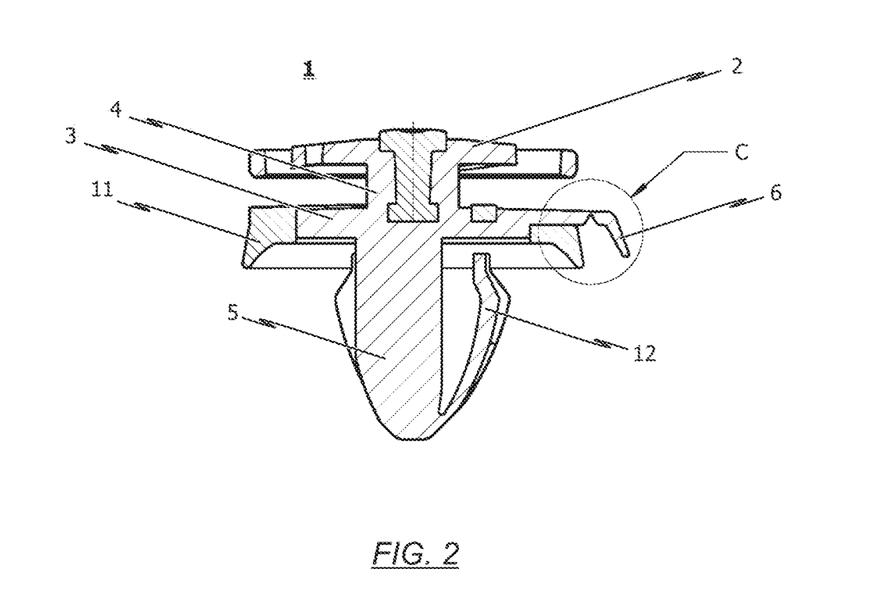
FIG. 2 shows the fastening element according to FIG. 1 schematically and in a sectional view.
Figure 12:
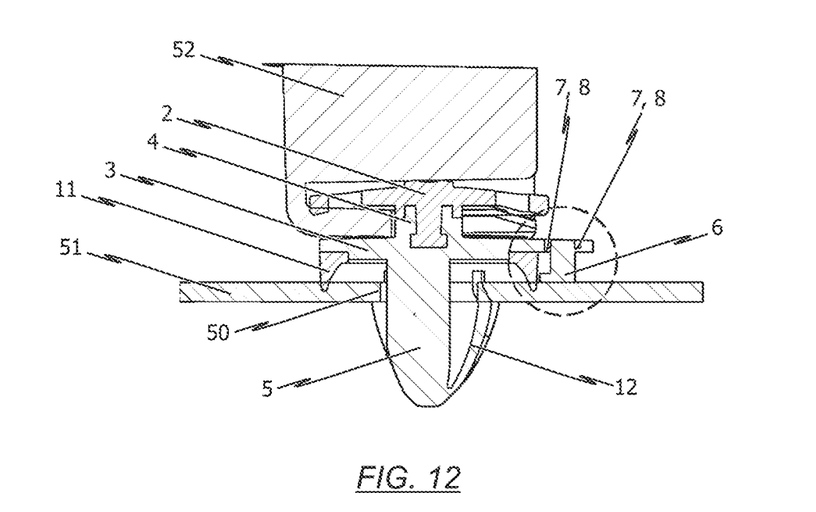
FIG. 12 shows the fastening element according to FIG. 11 in the installed state schematically and in a sectional view.

In detail, the second shaft region 5, as can be gathered, for example, from the schematic sectional views in FIG. 2 and in FIG. 12, has an elongate and substantially rectangular cross section and is therefore formed relatively flat.

The second shaft section has a point at the distant end region of the fastening element 1. Starting from the point, a total of three spring elements 12 are integrally formed in a manner offset by 120° with respect to the second shaft region 5, said spring elements 12 extending obliquely upward (i.e. to the proximal end region of the fastening element 1 or in the direction of the head region 2 of the fastening element 1).

However, the invention is not limited to the total of three spring elements 12 per fastening element 1 in the drawings; on the contrary, embodiments having, for example, two spring elements 12 or more than three spring elements 12 would also be conceivable.

Each of the total of three spring elements 12 has, at its proximal end region, i.e. at the end region facing the flange region 3 of the fastening element 1, a shoulder or latching surface with which it is possible to reach under a hole edge, i.e. the boundary or the edge region of the opening 50 provided in the vehicle body part 51, if the fastening element 1 and in particular the second shaft region 5 of the fastening element 1 are inserted into a fastening hole (opening 50). In this case, the spring elements 12 are deformed in the direction of the shaft region of the fastening element 1 or toward the shaft region of the fastening element 1 until the latching surfaces snap behind the hole edge.

Such a function is known per se at least in principle and will therefore not be described further here.

In order, during the assembly of the fastening elements 1, to ensure that the latter are inserted correctly into the opening 50 in the vehicle body part 51 so that an effective snap connection can be formed between the fastening element 1 and the vehicle body part 51, the fastening elements 1 shown by way of example in the drawings are each formed with corresponding indicator elements 6.

In detail, in each embodiment of the fastening element 1 according to the invention that are shown in the drawings, a total of three indicator elements 6 are provided, which are arranged in a preferably uniform distribution in the circumferential direction of the fastening element 1.

It is thereby possible with the aid of the indicator elements 6 to signal in particular acoustically and/or visually that the corresponding fastening element 1 is positioned precisely in the opening 50 of the vehicle body part 51 and that, for example, the second shaft region 5 of the fastening element 1 does not tilt with the opening 50.

The indicator elements 6 are therefore designed to signal that the spring elements 12, which are connected to the second shaft region 5 of the fastening element 1, have reached their installed position and can form a corresponding snap connection with the vehicle body part 51.

In detail, the indicator elements 6 used in the exemplary embodiments of the fastening element 1 according to the invention are designed in particular to acoustically and/or visually signal that a minimum pressure force exerted on the second shaft region 5 during assembly of the fastening element 1, in particular via the head region 2 of the fastening element 1, has been reached, which minimum pressure force is required for the second shaft region 5 to extend, at least in certain regions, with the spring elements 12 integrally formed there on the tip of the second shaft region 5, through the opening 50 in the vehicle body part 51 to the extent that a snap connection with the boundary of the opening 50 in the vehicle body part 51 can be formed with the second shaft region 5 and in particular with the spring elements 12 on the second shaft region 5 of the fastening element 1.

The indicator elements 6 are each designed here as an element protruding radially from the fastening element 1, at least in certain regions. This can be gathered in particular from the sectional views in FIG. 2 and FIG. 12 and especially also in the detailed views in FIG. 3, FIG. 6 and FIG. 9.

Figure 3:
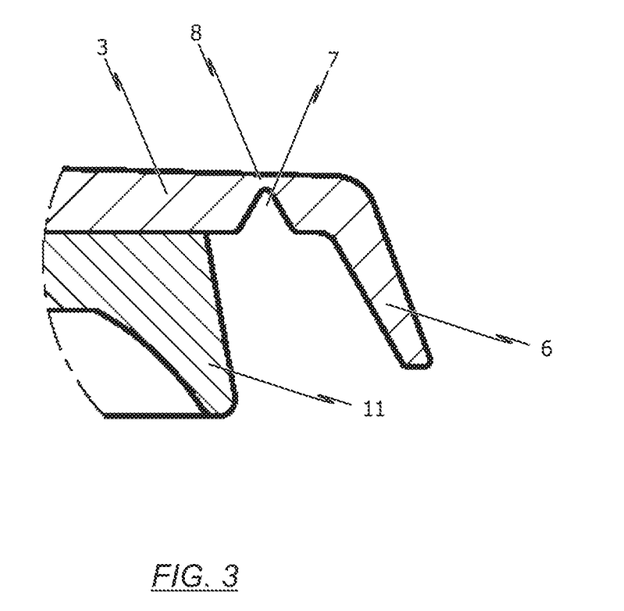
FIG. 3 shows schematically a detailed view of the region indicated by the reference C in FIG. 2.
Figure 4:
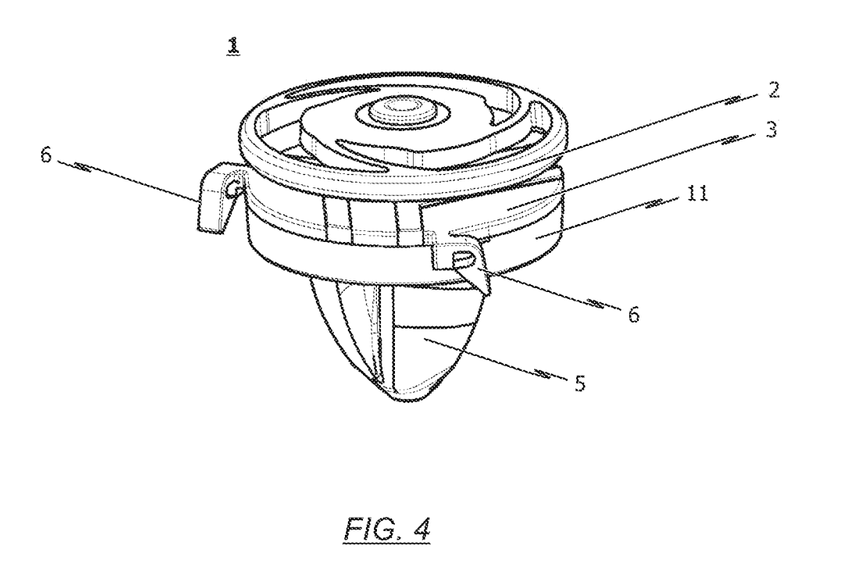
FIG. 4 shows a second exemplary embodiment of the fastening element according to the invention schematically and in an isometric view.
Figure 5:
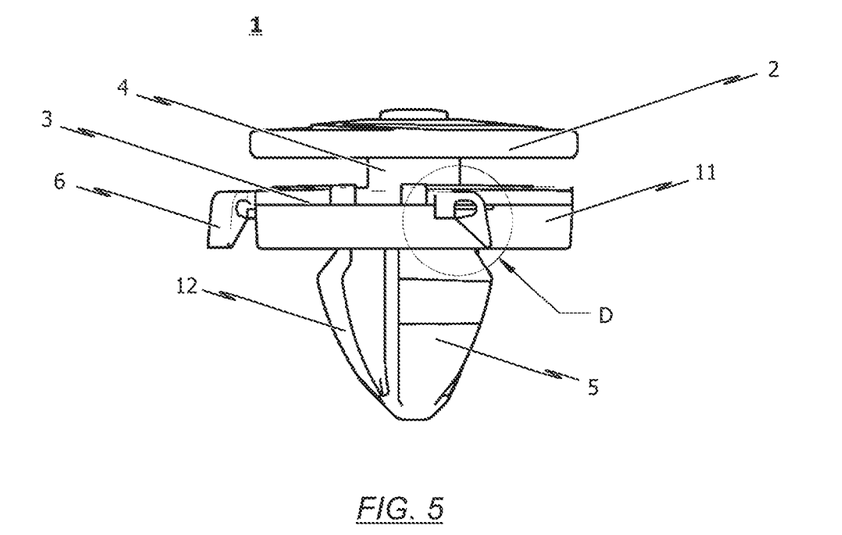
FIG. 5 shows the exemplary embodiment of the fastening element according to FIG. 4 schematically and in a side view.
Figure 6:
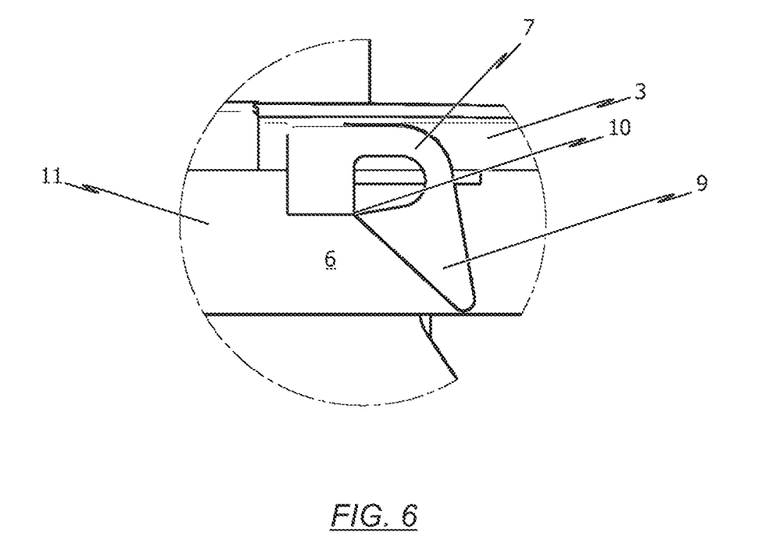
FIG. 6 shows schematically a detailed view of the region indicated by the reference sign D in FIG. 5.
Figure 7:
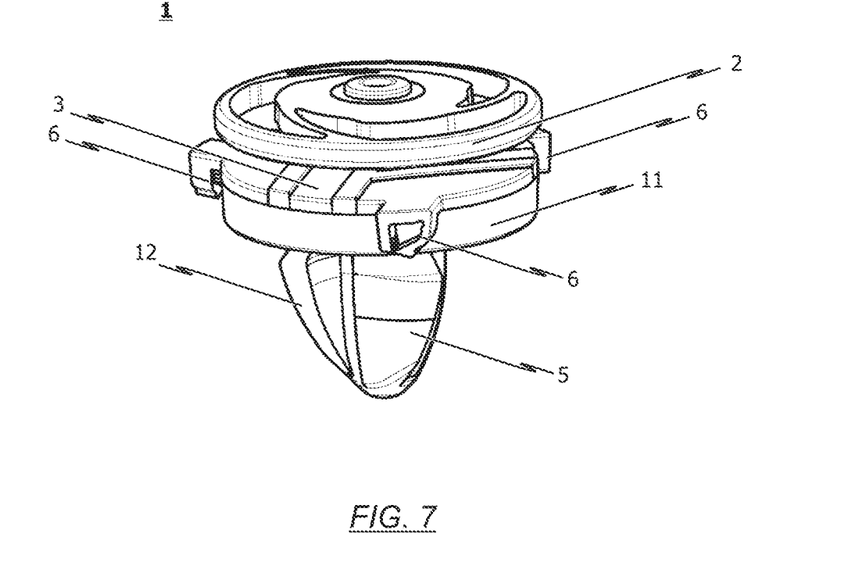
FIG. 7 shows a third exemplary embodiment of the fastening element according to the invention schematically and in an isometric view.
Figure 8:
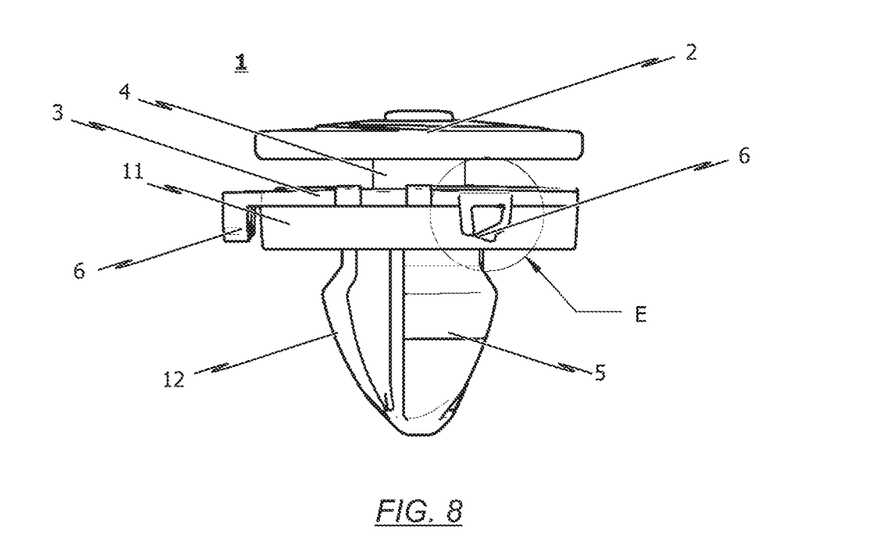
FIG. 8 shows the exemplary embodiment of the fastening element according to FIG. 7 schematically and in a side view.
Figure 9:
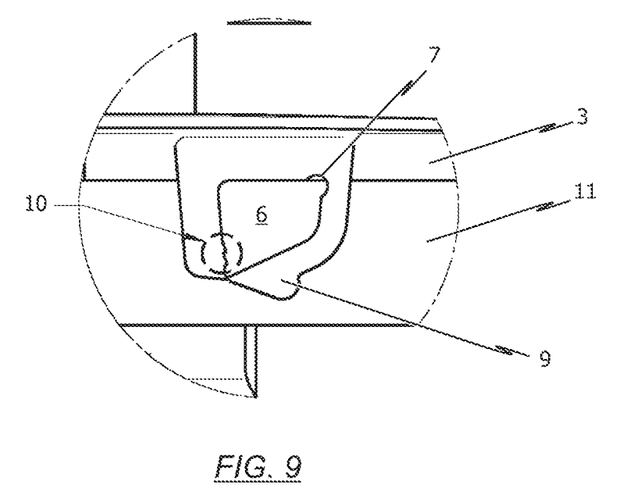
FIG. 9 shows schematically a detailed view of the region indicated by the reference sign E in FIG. 8.

It can be gathered in particular from the detailed view in FIG. 3 (first exemplary embodiment), in FIG. 6 (second exemplary embodiment) and in FIG. 9 (third exemplary embodiment) that the indicator elements 6 which protrude radially from the fastening element 1, at least in certain regions, are connected to the flange region 3 of the fastening element 1 via a joint region 7.

In detail, said jointed connection is formed in such a manner that, during the assembly of the fastening element 1 in or into the opening 50 in the motor vehicle body part 51, the radially protruding indicator element 6 is pressed through the boundary or edge region of the opening 50 relative to the flange region 3 and relative to the first shaft region 4 of the fastening element 1 contrary to the insertion direction (i.e. in the direction of the head region 2 of the fastening element 1).

Figure 10:
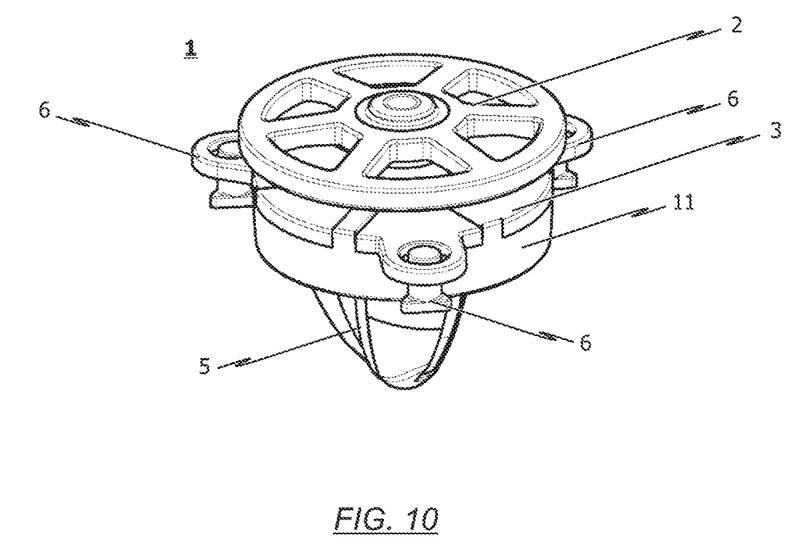
FIG. 10 shows a fourth exemplary embodiment of the fastening element according to the invention schematically and in an isometric view.

Also the at least one indicator element 6 used in the fourth exemplary embodiment is designed as an element which protrudes radially from the fastening element 1, at least in certain regions, and is connected (at least indirectly) to the flange region 3 of the fastening element 1 via joint regions 7.

As an alternative thereto, it would, however, also be conceivable in principle if the indicator elements 6, rather than being connected to the flange region 3 via corresponding joint regions 7, are connected in a jointed manner, for example, to the first shaft region 4 of the fastening element 1.

In the first, second and fourth exemplary embodiments, the indicator elements 6 used there are designed as destructively formed indicator elements 6, which are formed in particular to in particular optically and acoustically signal an assembly state of the fastening element 1 in a non-regenerative manner.

For this purpose, it is provided, in the case of these indicator elements 6, that the joint region 7, via which the indicator element 6 is connected (at least indirectly) to the flange region 3 of the fastening element 1 in a jointed manner, has at least one predetermined kink point 8. The predetermined kink point 8 is formed here to collapse under a previously specified or specifiable critical pressure load contrary to the insertion direction of the fastening element 1 (i.e. in the direction of the head region 2 of the fastening element 1) and therefore to lose its function as a joint region 7.

The critical pressure load is preferably specified here such that it is reached when the minimum pressure force required for assembly of the fastening element 1 is exerted on the fastening element 1 in the insertion direction (i.e. in the direction of the distal end region of the fastening element 1).

If—as in the exemplary embodiments shown in the drawings—a plurality of indicator elements 6 are used per fastening element 1, the critical pressure load should, of course, be correspondingly adapted for each joint region 7 of the indicator elements 6.

The joint regions 7 which are used in the case of the indicator elements 6 according to at least the first, second and fourth embodiment are provided with a securing device since the joint regions 7 have predetermined kink points 8 rather than predetermined breaking points. Said predetermined kink points are distinguished in that, after the predetermined kink points 8 have responded, the joint region 7 remains physically interconnected via a film hinge or film joint.

In the third exemplary embodiment of the fastening element 1 according to the invention, the indicator elements 6 are preferably formed non-destructively, and instead are designed such that they are capable of signaling an assembly state of the fastening element 1 in particular acoustically and in a regenerative manner.

For this purpose, the indicator elements 6 each have an arm region 9 extending in the insertion direction, at least in certain regions. The arm region 9 is connected in a jointed manner to the flange region 3 (or optionally to the first shaft region 4) of the fastening element 1 such that the arm region 9 can move relative to the first shaft region 4 and relative to the flange region 3 in a direction contrary to the insertion direction of the fastening element 1.

Furthermore—as can be gathered in particular from the detailed view in FIG. 9—a notch arrangement or at least one notch 10 is associated with the indicator element 6 used in this (third) exemplary embodiment, into which notch arrangement or notch the distal end region of the arm region 9 engages during its movement relative to the first shaft region 4 and relative to the flange region 3 in the direction contrary to the insertion direction of the fastening element 1. This engagement provides additional acoustic feedback to the person assembling the fastening element 1.

The arm region 9 of each indicator element 6 extending in the insertion direction, at least in certain regions, has a distal end region which (in a non-assembled state of the fastening element 1) is located in a plane which is spaced further from the plane in which, or through which, the head region 2 of the fastening element 1 is located or extends than the plane in which, or through which, the flange region 3 of the fastening element 1 is located or extends.

Figure 11:
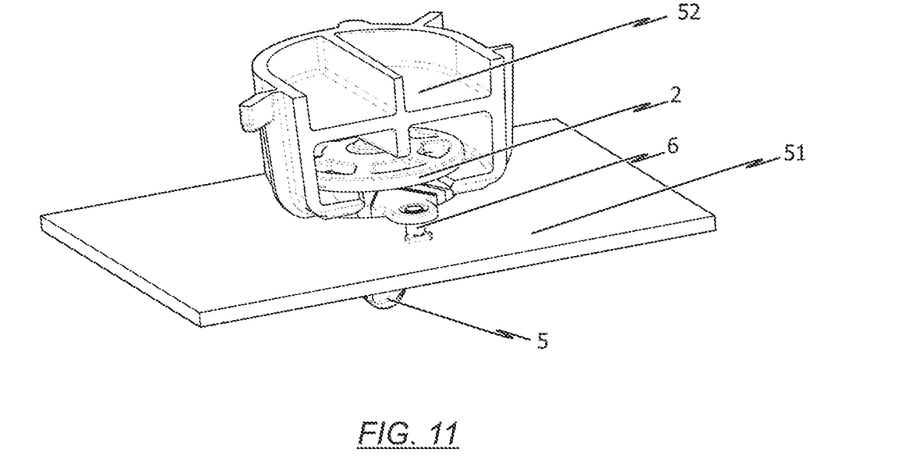
FIG. 11 shows the exemplary embodiment of the fastening element according to the invention in the installed state schematically and in an isometric view.

In the exemplary embodiments of the fastening element 1 according to the invention that are shown in the drawings, the region between the flange region 3 and the head region 2 serves for receiving the object 52 to be fastened to the vehicle body part 51, as can be gathered in particular from the illustrations in FIG. 11 and FIG. 12.

The invention is not restricted to the exemplary embodiments shown in the drawings, but rather emerges from an overall view of all of the features disclosed therein.

What is claimed is:

1. A fastening element for insertion into an opening of a part, wherein the fastening element has a head region, a flange region, which is either a bottom part of the head region, or which is spaced from the head region and connected to the head region via a first shaft region, and a second shaft region, which continues from the flange region on a side opposite the head region and is formed such that, in an inserted state of the fastening element in the opening, the second shaft region extends through the opening, at least in certain regions, and forms a snap connection with the part, wherein at least one indicator element is associated with the fastening element for acoustically signaling an assembly state of the fastening element with the part in order to assist in achieving the snap connection between fastening element and the part;
   wherein the at least one indicator element is designed as an element which protrudes radially from the fastening element, at least in certain regions, and which is connected to the flange region or first shaft region of the fastening element via at least one joint region such that, during assembly of the fastening element into or in the opening, the indicator element is pressed through a boundary or edge region of the opening relative to the flange region and/or relative to the first shaft region contrary to an insertion direction of the fastening element.

2. The fastening element as claimed in claim 1, wherein the at least one indicator element is formed to acoustically signal that a minimum pressure force exerted on the second shaft region via the head region of the fastening element during the assembly of the fastening element has been reached, wherein the minimum pressure force is required for the second shaft region to extend through the opening, at least in certain regions, to an extent that a snap connection with the boundary or edge region of the opening can be formed with the second shaft region of the fastening element.

3. The fastening element as claimed in claim 1, wherein the at least one indicator element is designed as a destructively formed indicator element, which is formed to acoustically signal the assembly state of the fastening element in a non-regenerative manner by means of a click noise caused by a snapping or collapse of a predetermined kink point or predetermined breaking point of the indicator element.

4. The fastening element as claimed in claim 1, wherein the at least one joint region has at least one predetermined kink point, which is formed to collapse under a previously specified or specifiable critical pressure load contrary to the insertion direction of the fastening element, wherein the critical pressure load is specified such that it is reached when a minimum pressure force required for the assembly of the fastening element is exerted on the fastening element in the insertion direction.

5. The fastening element as claimed in claim 4, wherein a securing device is associated with the at least one indicator element, which securing device is formed such that the indicator element is not physically separated from the fastening element in spite of the collapse of the at least one predetermined kink point.

6. The fastening element as claimed in claim 5, wherein the securing device is designed as a film hinge or film joint formed in the at least one joint region of the at least one predetermined kink point.

7. The fastening element as claimed in claim 1, wherein the at least one indicator element is formed in one piece at least with the flange region and with the first and/or second shaft region and, together with the flange region and the first and/or second shaft region, has a monolithic construction made from plastics material.

8. The fastening element as claimed in claim 1, wherein a plurality of indicator elements are provided, which are arranged in a uniform distribution in a circumferential direction of the fastening element.

9. The fastening element as claimed in claim 1, wherein the second shaft region has at least one spring element, which is formed to reach under the boundary or edge region of the opening in the assembled state of the fastening element.

10. The fastening element as claimed in claim 1, wherein the fastening element is a plastics injection-molded part and is designed as a vehicle panel fastener and is formed for insertion into a through bore in a part of a vehicle body.

11. The fastening element as claimed in claim 1, wherein the head region has a centering spring for radial centering of an object to be fastened to the head region, wherein the centering spring is integrally produced with the fastening element in a multi-component injection-molding method, wherein the centering spring is made from a softer material than the flange region and/or the second shaft region.

12. The fastening element as claimed in claim 11, wherein the at least one indicator element has an axially extending pin element, which is held in an axial opening of a radially outwardly extending lug of the flange region or the first shaft region via at least two radially extending predetermined breaking points and is designed such that, when a minimum pressure force exerted on the second shaft region via the head region of the fastening element, during the assembly of the fastening element is reached, the pin element is axially displaced with respect to the lug to an extent that the predetermined breaking points collapse.

13. A fastening element for insertion into an opening of a part, wherein the fastening element has a head region, a flange region, which is either a bottom part of the head region, or which is spaced from the head region and connected to the head region via a first shaft region, and a second shaft region, which continues from the flange region on a side opposite the head region and is formed such that, in an inserted state of the fastening element in the opening, the second shaft region extends through the opening, at least in certain regions, and forms a snap connection with the part, wherein at least one indicator element is associated with the fastening element for acoustically signaling an assembly state of the fastening element with the part in order to assist in achieving the snap connection between fastening element and the part;

wherein the at least one indicator element has an arm region extending in an insertion direction of the fastening element, at least in certain regions, wherein a distal end region of the arm region is located in a plane which is spaced further from the plane in which, or through which, the head region of the fastening element is located or extends than the plane in which, or through which, the flange region of the fastening element is located or extends.

14. The fastening element as claimed in claim 13, wherein the arm region of the at least one indicator element is connected in a jointed manner to the first shaft region or to the flange region of the fastening element such that the arm region can move relative to the first shaft region and/or relative to the flange region of the fastening element in a direction contrary to the insertion direction of the fastening element, wherein a notch arrangement or at least one notch is associated with the at least one indicator element, in which the notch arrangement or the at least one notch the distal end region of the arm region engages during its movement relative to the first shaft region and/or relative to the flange region of the fastening element.

15. The fastening element as claimed in claim 14, wherein the fastening element has, on the flange region, a seal having a circumferential outer sealing face, a) wherein, in a non-assembled state of the fastening element, the outer sealing face is located in a plane which is spaced further from the plane in which, or through which, the head region of the fastening element is located or extends than the plane in which, or through which, the distal end region of the at least one indicator element is located or extends and/or b) wherein the distal end region of the at least one indicator element is arranged radially outside the outer sealing face.

16. A fastening element for insertion into an opening of a vehicle body part, the fastening element comprising:

a head region, a flange region, which is either a bottom part of the head region or which is spaced from the head region and connected to the head region via a first shaft region, a second shaft region, which continues from the flange region on a side opposite the head region and is formed such that, in an inserted state of the fastening element in the opening, the second shaft region extends at least partly through the opening and forms a snap connection with the vehicle body part, and at least one indicator element carried by the fastening element for acoustically signaling an assembly state of the fastening element into the opening of the vehicle body part once the snap connection is achieved;

wherein the at least one indicator element is designed as a destructively formed indicator element, which is formed to acoustically signal the assembly state of the fastening element in a non-regenerative manner by means of a click noise caused by a snapping or collapse of a predetermined kink point or predetermined breaking point of the indicator element.

* * * * *